United States Patent [19]

Namai

[11] Patent Number: 6,137,962
[45] Date of Patent: *Oct. 24, 2000

[54] POWER TRANSMISSION APPARATUS WITH BUILT-IN PHASE CONTROL

[75] Inventor: Akihiro Namai, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/961,123

[22] Filed: Oct. 30, 1997

[30] Foreign Application Priority Data

Nov. 8, 1996 [JP] Japan .................................. 8-296584

[51] Int. Cl.[7] ...................................................... G03B 17/42
[52] U.S. Cl. ............................ 396/401; 396/411; 74/437; 74/457
[58] Field of Search ................................... 396/387, 395, 396/396, 401, 402, 403, 411; 74/374, 386, 437, 457, 640

[56] References Cited

U.S. PATENT DOCUMENTS 2,399,925  5/1946  Hewlett, Jr. .............................. 74/437
3,218,966  11/1965  Petit ...................................... 74/437 X

*Primary Examiner*—David M. Gray
*Attorney, Agent, or Firm*—Robin, Blecker & Daley

[57] ABSTRACT

A power transmission apparatus adapted for an apparatus such as a camera or the like includes a first toothed wheel having teeth at least one predetermined tooth of which differs in tooth thickness from at least one different tooth of the teeth, a second toothed wheel which meshes with the first toothed wheel, the second toothed wheel having tooth spaces at least one predetermined tooth space of which meshes with the at least one predetermined tooth of the first toothed wheel and differs in space interval from at least one different tooth space of the tooth spaces, a determination device which determines a rotating position of the first toothed wheel, and an operating device which performs a predetermined operation according to a rotating position of the second toothed wheel.

29 Claims, 3 Drawing Sheets

$(360/Z/2)$

FIG. 5 (PRIOR ART)
FIG. 6 (PRIOR ART)
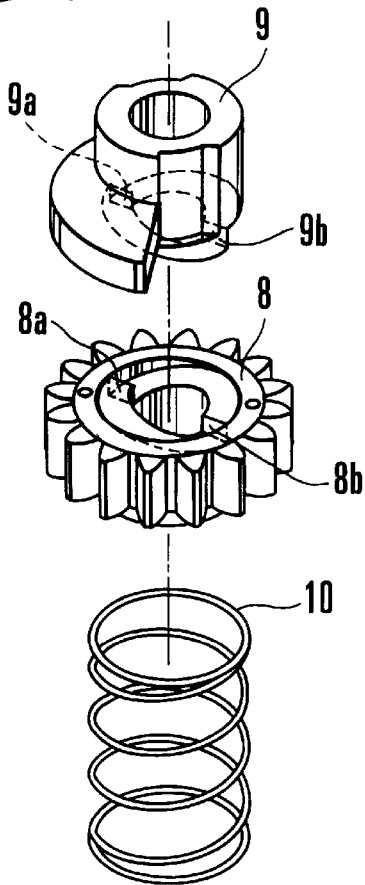
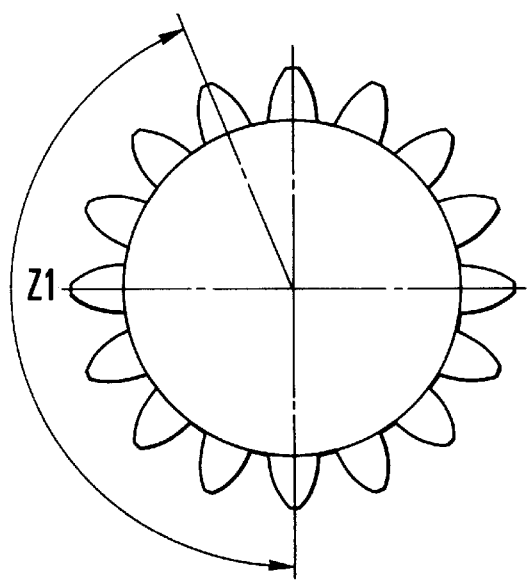

POWER TRANSMISSION APPARATUS WITH BUILT-IN PHASE CONTROL

BACKGROUND OF THE INVENTION

1. Field of the Invention

The present invention relates to a power transmission apparatus adapted for an optical apparatus such as a camera or the like.

2. Description of Related Art

Some cameras are provided with power transmission apparatuses for transmitting a film transporting power to a lens barrel driving mechanism or a charging member of a shutter mechanism. FIG. 4 shows, by way of example, the arrangement of a charging mechanism which is one of such power transmission apparatuses.

Referring to FIG. 4, a sprocket 1 is arranged to engage perforations provided in a film 2 and to be caused to make one rotation clockwise when the film 2 is transported to the right as viewed in FIG. 4 to an extent corresponding to one frame thereof. A pulse base plate 3 is arranged to rotate integrally with the sprocket 1. Pulse contact pieces 4 and 5 are in sliding contact with the pulse base plate 3 and are arranged to output two ON and OFF pulses from them while the sprocket 1 and the pulse base plate 3 make one rotation. Pulse plate 3 and pulse contact pieces 4 and 5 thus comprise a determination device which determines a rotating position of a first toothed wheel (sprocket gear 6, discussed below). These ON and OFF pulses are sent to a control device (not shown). The control device causes a film transporting action to come to a stop upon receipt of the ON pulse for the second time after the commencement of the film transporting action, so that the film transporting action for one frame is completed.

A sprocket gear 6 is arranged to rotate integrally with the sprocket 1. The sprocket gear 6 is arranged to engage with an idle gear 7, which, in turn, is arranged to engage with a charge gear 8, which is a toothed wheel. A charge cam 9 is rotatably mounted coaxially with the charge gear 8. As shown in FIG. 5, the charge gear 8 is provided with one-way cams 8a and 8b, and the charge cam 9 is provided with cam projections 9a and 9b, which are arranged to engage with and disengage from the one-way cams 8a and 8b. The charge gear 8 is urged by a spring 10 to move toward the charge cam 9. When the charge gear 8 rotates clockwise as viewed in FIG. 5, the cam projections 9a and 9b mesh with the one-way cams 8a and 8b, so that the rotation of the charge gear 8 is transmitted to the charge cam 9, and both the charge gear 8 and the charge cam 9 rotate integrally. When the charge gear 8 rotates counterclockwise, on the other hand, the cam projections 9a and 9b slip on the tapered parts of the one-way cams 8a and 8b, so that the rotation of the charge gear 8 is not transmitted to the charge cam 9, and, therefore, the charge cam 9 does not rotate in that instance.

A charge lever 11 is rotatably mounted on a shaft 12. The charge lever 11 is urged by a spring 13 to swing counter-clockwise as viewed FIG. 4 and is thus caused to abut on a stopper 14. In FIG. 4, reference numeral 15 denotes a charging member provided for a shutter or the like (not shown). Shutter charging member 15 is thus a component of optical apparatus, such as a camera.

In the power transmission apparatus configured as described in the foregoing, when the film 2 is transported to the right, as viewed in FIG. 4, to cause the sprocket 1 to rotate clockwise, the charge gear 8 is caused through the sprocket gear 6 and the idle gear 7 to rotate clockwise. The clockwise rotation of the charge gear 8 causes the charge cam 9 to rotate integrally with the charge gear 8, i.e., toothed wheel 8 is integrally provided with charge cam 9 which is a member for a charging operation. When the charge cam 9 has rotated 180 degree from the state shown in FIG. 4, a cam part 9c of the charge cam 9 comes to push a projection 11a of the charge lever 11, so that the charge lever 11 is caused to rotate in the clockwise direction.

When the charge lever 11 rotates in the clockwise direction, an end part 11b of the charge lever 11 causes the charging member 15 to move to the left, thereby performing a charging action. Charging member 15 accordingly is an operating device which performs a predetermined operation (charging) according to a rotating position of a second toothed wheel (gear 8). Charging member 15 is thus a device for a charging operation, particularly, a shutter charging operation. At a point of time at which the charging action is completed, the projection 11a of the charge lever 11 over-rides the cam part 9c of the charge cam 9, and the charge lever 11 is brought back to the state shown in FIG. 4 by the urging force of the spring 13. After the return of the charge lever 11, the phase of the pulse base plate 3 takes a position where the ON pulse is outputted for the second time through the pulse contact pieces 4 and 5, and the film transporting action for one frame comes to an end.

In the power transmission apparatus described above, it would become impossible to operate the shutter or the like unless the charging action is adequately completed before the completion of the film transporting action. Therefore, the phase of the pulse base plate 3 which generates pulses for controlling the film transporting action and the phase of the charge cam 9 provided for the charging action must be matched with, or adjusted to, each other.

According to the conventional method for such phase matching or adjustment, marks 7a and 8c are provided respectively on the idle gear 7 and the charge gear 8. In assembling the camera, an end face 3a of a conductive pattern of the pulse base plate 3 is adjusted to one of the marks 7a of the idle gear 7. After that, the other mark 7a of the idle gear 7 is adjusted to one of the marks 8c of the charge gear 8.

However, since the phase matching work is performed simply through visual confirmation, these parts tend to be assembled in a state of having a phase deviation between them. Besides, in the event of such misassembly, the misassembly tends to be left undiscovered until the shutter or the like is actually operated. Upon discovery of such Disassembly, however, the camera must be disassembled for correction of the misassembly. This is a serious problem.

Further, in cases where these parts are assembled at such phases that cause the charging action to be finished earlier than a normal timing, the shutter or the like might begin to be operated at a point of time where the charging action at the next phase begins. Then, although the shutter can be operated, it is impossible to know whether the shutter operation is performed up to the end of a normal operating range. Despite such a state, the camera might be allowed to pass the process of assembly inspection without correcting the phase deviation of parts.

BRIEF SUMMARY OF THE INVENTION

In accordance with one aspect of the invention, there is provided a power transmission apparatus adapted for an apparatus such as a camera or the like, which comprises a first toothed wheel having teeth at least one predetermined tooth of which differs in tooth thickness from at least one different tooth of the teeth, a second toothed wheel which meshes with the first toothed wheel, the second toothed wheel having tooth spaces at least one predetermined tooth space of which meshes with the at least one predetermined tooth of the first toothed wheel and differs in space interval from at least one different tooth space of the tooth spaces, a determination device which determines a rotating position of the first toothed wheel, and an operating device which performs a predetermined operation according to a rotating position of the second toothed wheel, so that the phase of the operating device can be simply and reliably matched with the phase of the determination device.

The above and other aspects and features of the invention will become apparent from the following detailed description of embodiments thereof taken in connection with the accompanying drawings.

BRIEF DESCRIPTION OF THE SEVERAL VIEWS OF THE DRAWING

FIG. 5 is an exploded perspective view showing the arrangement of the vicinity of a charge cam in the charging mechanism shown in FIG. 4.

FIG. 6 shows an ordinary gear shape which is conventionally formed in general.

DETAILED DESCRIPTION OF THE INVENTION

Hereinafter, preferred embodiments of the invention will be described in detail with reference to the drawings.

Figure 1:
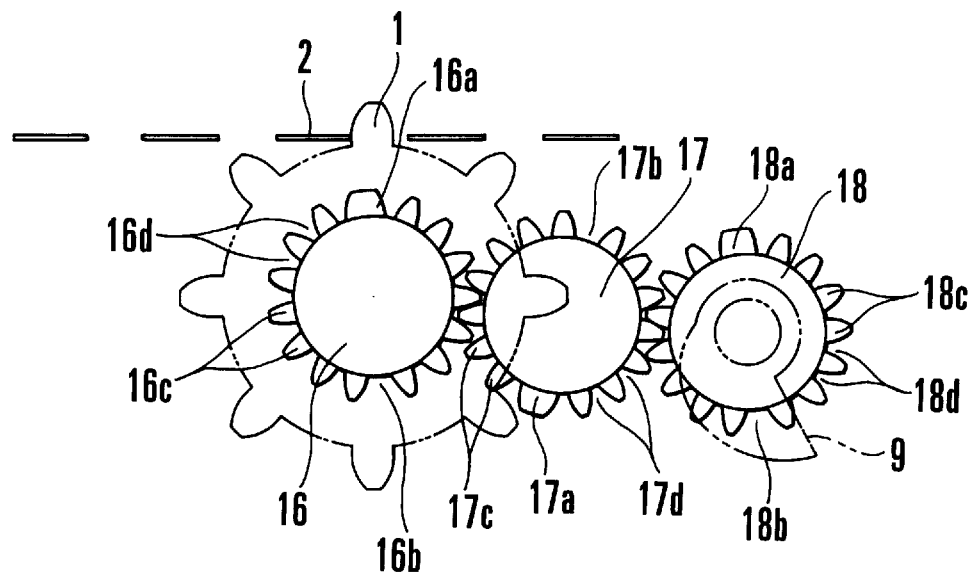
FIG. 1 is a plan view showing essential parts of a power transmission apparatus according to a first embodiment of the invention.
Figure 2:
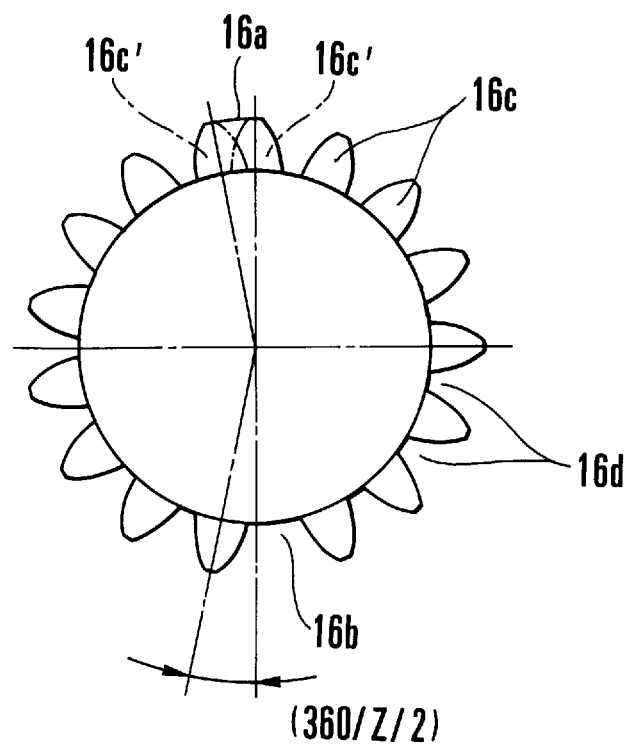
FIG. 2 is a diagram for explaining the method of forming a phase matching tooth employed in the power transmission apparatus.
Figure 4:
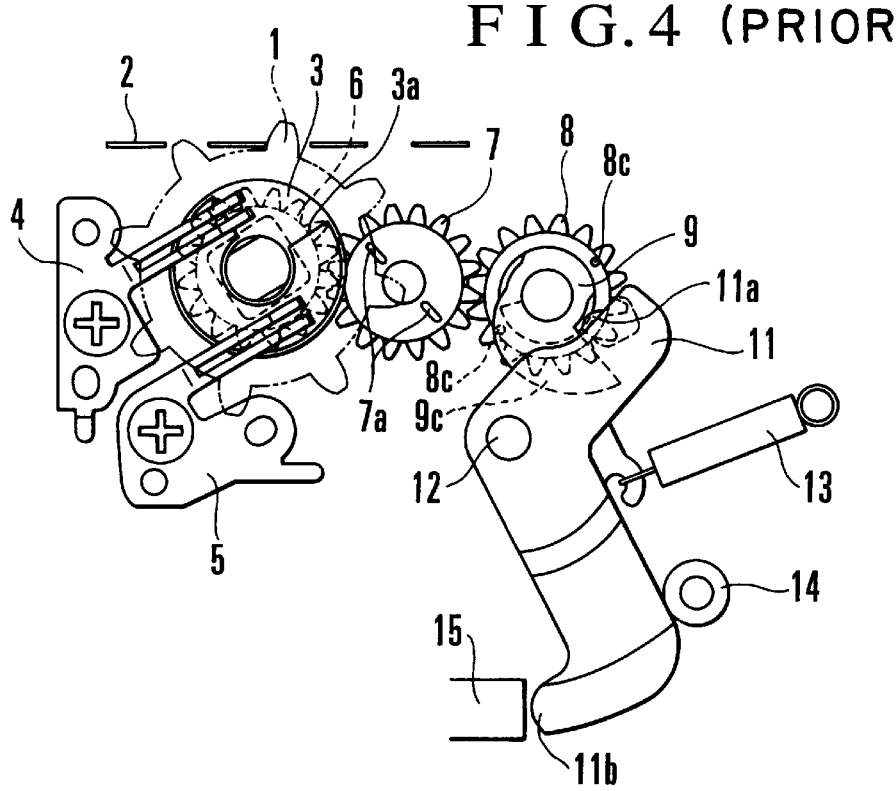
FIG. 4 shows the arrangement of the conventional charging mechanism in a camera.

FIGS. 1 and 2 show essential parts (corresponding only to a gear train part of the mechanism shown in FIG. 4) of a charging mechanism of a camera according to a first embodiment of the invention. Referring to FIGS. 1 and 2, a sprocket 1 is arranged to engage the perforations of a film 2 and to be caused to make one rotation clockwise when the film 2 is moved to the right as viewed in FIG. 1 to an extent corresponding to one frame thereof.

A sprocket gear 16 is arranged to rotate integrally with the sprocket 1. The sprocket gear 16 is arranged to engage with an idle gear 17, which, in turn, is arranged to engage with a charge gear 18. A charge cam 9 is rotatably mounted coaxially with the charge gear 18 and is arranged to charge a lens barrel or a shutter. Charging member 15 of FIG. 4 would thus be a component of such lens barrel or shutter. The arrangement and actions of the charge gear 18 and the charge cam 9 are similar to those of the charge gear 8 and the charge cam 9 shown in FIG. 4.

When the sprocket 1 and the sprocket gear 16 rotate clockwise with the film 2 beginning to be transported, the rotation of the sprocket gear 16 is transmitted to the charge gear 18 through the idle gear 17 to rotate the charge cam 9. When the charge cam 9 has rotated 180 degrees from the state shown in FIG. 1, the charge cam 9 comes to push a charge lever (not shown) to swing clockwise, thereby performing a charging action. Upon completion of the charging action, the charge lever is brought back to the state shown in FIG. 1. Then, the film transporting action for one frame is completed.

In the case of the first embodiment, the sprocket gear 16, the idle gear 17 and the charge gear 18 have the same toothed-wheel shape. Each of the gears 16, 17 and 18 has a number of teeth 16c, 17c or 18c each of which has the same standard tooth thickness and a phase matching tooth 16a, 17a or 18a which has a tooth thickness thicker than the teeth 16c, 17c or 18c. Further, in each of the gears 16, 17 and 18, there are formed a phase matching tooth space 16b, 17b or 18b which is located on a side opposite to the phase matching tooth 16a, 17a or 18a. The space interval of the phase matching tooth space 16b, 17b or 18b is wider than that of each of tooth spaces 16d, 17d or 18d formed between the adjacent teeth 16c, 17c or 18c, and corresponds to the tooth thickness of the phase matching tooth 16a, 17a or 18a.

FIG. 2 shows, by way of example, the details of only the sprocket gear 16, among the gears 16, 17 and 18 which are formed in the same shape. As shown in FIG. 2, the phase matching tooth 16a is formed to be thicker circumferentially of gear 16 by (360/"total number of teeth"/2) degrees, i.e., a ½-pitch angle, than the other teeth 16c. In other words, referring to FIG. 6 which shows a standard toothed wheel, the phase matching tooth 16a has a tooth thickness defined by a distance between the lines of outer meshing surfaces of two partially overlapped teeth 16c' obtained by shifting clockwise an angular part Z1 which includes one-half of teeth of the standard toothed wheel. The phase matching tooth 16a is thus in a shape encompassed with these lines of the meshing surfaces and a line obtained by connecting the tooth crests of the two teeth 16c'. Since, in the first embodiment, the number of teeth of the gear 16 is sixteen, the angular part Z1 including eight teeth, which is one-half of sixteen teeth, is turned clockwise as much as (360/16/2)=11.25 degrees. Thus, each of the phase matching teeth 16a, 17a and 18a which are formed to be thicker than the other teeth has a tooth thickness corresponding to 1.5 teeth.

Further, correspondingly with the tooth thickness of the phase matching tooth 16a, 17a or 18a, each of the phase matching tooth spaces 16b, 17b and 18b is formed to have a space interval corresponding to 1.5 teeth, accordingly. Therefore, the phase matching tooth 16a of the sprocket gear 16 can mesh with the teeth 17c which are adjacent to the phase matching tooth space 17b of the idle gear 17. The phase matching tooth 17a of the idle gear 17 can mesh with the teeth 16c and 18c which are adjacent respectively to the phase matching tooth spaces 16b and 18b of the sprocket gear 16 and the charge gear 18. Further, the phase matching tooth 18a of the charge gear 18 can mesh with the teeth 17c which are adjacent to the phase matching tooth space 17b of the idle gear 17.

Incidentally, according to the method of shifting the phase of the half part of the toothed wheel as much as (360/"total number of teeth"/2) degrees, as mentioned above, the shape of each of the phase matching teeth can be decided by using a standard toothedwheel shape.

Then, at the time of assembling the power transmission apparatus, the sprocket gear 16, the idle gear 17 and the charge gear 18 which have their shapes decided as mentioned above can be assembled only at phases at which the phase matching teeth 16a, 17a and 18a are in mesh with the teeth 16c, 17c and 18c which are adjacent respectively to the phase matching tooth spaces 16b, 17b and 18b. Therefore, the gears 16, 17 and 18 can be effectively prevented from being assembled in a phase deviating state.

Figure 3:
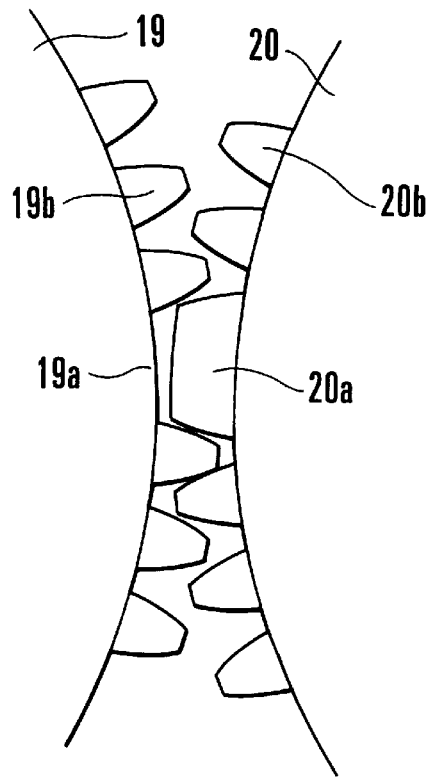
FIG. 3 is a plan view showing essential parts of a power transmission apparatus according to a second embodiment of the invention.

FIG. 3 shows a second embodiment of the invention. In cases where gears 19 and 20 having a great number of teeth are arranged to be in mesh with each other at a high contact ratio, a phase matching tooth 20a provided in the gear 20 may be formed to be thicker as much as (360/"total number of teeth"×n (integer)) degrees, i.e., an integer-pitch angle, than the other teeth. In the case of the second embodiment, the phase matching tooth 20a is formed to be thicker as much as a one-pitch angle (n=1) than the other teeth. Thus, the phase matching tooth 20a is formed to have a tooth thickness sandwiched between the outer meshing surfaces of two standard teeth 20b. In this instance, the other gear 19 has a phase matching tooth space 19a formed by cutting out one standard tooth 19b.

The two intermeshing gears 19 and 20 which are arranged in the above manner also can be assembled, like in the case of the first embodiment, only in a state of having the phase matching tooth 20a in mesh with the teeth which are adjacent to the phase matching tooth space 19a. Therefore, the gears 19 and 20 can be effectively prevented from being assembled in a state of deviating from their correct intermeshing phases.

Similarly to the arrangement of the first embodiment, the second embodiment permits phase adjustment or phase matching also by using a standard toothed-wheel shape.

In the case of each of the embodiments described above, the invention is applied to the charging mechanism (power transmission apparatus) of a camera. However, a power transmission apparatus according to the invention is applicable also to apparatuses other than cameras.

In other words, the invention is applicable to cameras of various kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

The invention may be carried out by combining as necessary the embodiments or their technological elements described in the foregoing.

The invention applies to cases where either the whole or a part of claims or the arrangement of each embodiment described forms one apparatus or is used in combination with some other apparatus or as a component element of an apparatus.

In each of the embodiments described above, a predetermined tooth of one of toothed wheels is arranged to be capable of meshing only with two teeth adjacent to a predetermined tooth space of the other toothed wheel. Therefore, any misassembly that results from visual work can be effectively prevented, thereby ensuring accurate phase matching.

According to the arrangement of each of the embodiments described above, an apparatus such as a camera or the like can be arranged to be free of any mistiming that results from a phase discrepancy between gears, such as the timing of completion of a film transporting action and the timing of end of a charging action.

What is claimed is:

1. A power transmission apparatus comprising:
(A) a first toothed wheel having teeth at least one predetermined tooth of which differs in tooth thickness circumferentially of said first tooth wheel from at least one different tooth of the teeth;
(B) a second toothed wheel which meshes with said first toothed wheel, said second toothed wheel having tooth spaces at least one predetermined tooth space of which meshes with said at least one predetermined tooth of said first toothed wheel and differs in space interval from at least one different tooth space of the tooth spaces, wherein said predetermined tooth of said first toothed wheel meshes with said predetermined tooth space of said second toothed wheel and does not mesh with other tooth spaces;
(C) a determination device which determines a rotating position of said first toothed wheel; and
(D) an operating device which performs a predetermined operation according to a rotating position of the second toothed wheel.

2. An apparatus according to claim 1, wherein said first toothed wheel rotates in association with movement of a film.

3. An apparatus according to claim 1, wherein said first toothed wheel is integrally provided with a sprocket which rotates in association with movement of perforations of a film.

4. An apparatus according to claim 1, wherein the tooth thickness of said at least one predetermined tooth of said first toothed wheel is greater than that of said at least one different tooth.

5. An apparatus according to claim 1, wherein the tooth thickness of said at least one predetermined tooth of said first toothed wheel is greater than that of said at least one different tooth by a value corresponding to a ½-pitch angle.

6. An apparatus according to claim 1, wherein the tooth thickness of said at least one predetermined tooth of said first toothed wheel is greater than that of said at least one different tooth by a value corresponding to an integer-pitch angle.

7. An apparatus according to claim 1, wherein said first tooth ed wheel has tooth spaces at least one predetermined tooth space of which differs in space interval from at least one different tooth space of the tooth spaces.

8. An apparatus according to claim 1, wherein said operating device includes a device for a charging operation.

9. An apparatus according to claim 1, wherein said operating device includes a device for a shutter charging operation.

10. An apparatus according to claim 1, wherein said operating device includes a device for a lens barrel charging operation.

11. An apparatus according to claim 1, wherein said second toothed wheel is integrally provided with a member for a charging operation.

12. An apparatus according to claim 1, wherein said power transmission apparatus includes a camera.

13. An apparatus according to claim 1, wherein said power transmission apparatus includes an optical apparatus.

14. A power transmission apparatus comprising:
(A) a first toothed wheel having tooth spaces at least one predetermined tooth space of which differs in space interval from at least one different tooth space of the tooth spaces;
(B) a second toothed wheel which meshes with said first toothed wheel, said second toothed wheel having teeth at least one predetermined tooth of which meshes with said at least one predetermined tooth space of said first toothed wheel and differs in tooth thickness circumferentially of said second toothed wheel from at least one different tooth of the teeth, wherein said predetermined tooth of said second toothed wheel meshes only with said predetermined tooth space and does not mesh with other tooth spaces;

(C) a determination device which determines a rotating position of said first toothed wheel; and (D) an operating device which performs a predetermined operation according to a rotating position of the second toothed wheel.

15. An apparatus according to claim 14, wherein said first toothed wheel rotates in association with movement of a film.

16. An apparatus according to claim 14, wherein said first toothed wheel is integrally provided with a sprocket which rotates in association with movement of perforations of a film.

17. An apparatus according to claim 14, wherein the space interval of said at least one predetermined tooth space of said first toothed wheel is greater than that of said at least one different tooth space.

18. An apparatus according to claim 14, wherein the space interval of said at least one predetermined tooth space of said first toothed wheel is greater than that of said at least one different tooth space by a value corresponding to a ½-pitch angle.

19. An apparatus according to claim 14, wherein the space interval of said at least one predetermined tooth space of said first toothed wheel is greater than that of said at least one different tooth space by a value corresponding to an integer-pitch angle.

20. An apparatus according to claim 14, wherein said operating device includes a device for a charging operation.

21. An apparatus according to claim 14, wherein said operating device includes a device for a shutter charging operation.

22. An apparatus according to claim 14, wherein said operating device includes a device for a lens barrel charging operation.

23. An apparatus according to claim 14, wherein said second toothed wheel is integrally provided with a member for a charging operation.

24. A power transmission apparatus comprising:

(A) a first toothed wheel having teeth at least one predetermined tooth of which differs is thicker in tooth thickness circumferentially of said first toothed wheel from at least one different tooth of the teeth by a value corresponding to a ½-pitch angle; and (B) a second toothed wheel which meshes with said first toothed wheel, said second toothed wheel having tooth spaces at least one predetermined tooth space of which meshes with said at least one predetermined tooth of said first toothed wheel and is wider in space interval than at least one different tooth space of the tooth spaces by a value corresponding to a ½-pitch angle, wherein said predetermined tooth of said first toothed wheel meshes with said predetermined tooth space of said second toothed wheel and does not mesh with other tooth spaces.

25. An apparatus according to claim 24, wherein said first toothed wheel rotates in association with movement of a film.

26. An apparatus according to claim 24, wherein said power transmission apparatus includes a camera.

27. An apparatus according to claim 24, wherein said power transmission apparatus includes an optical apparatus.

28. A power transmission apparatus comprising:

(A) a first toothed wheel having teeth at least one predetermined tooth of which differs in tooth thickness circumferentially of said first tooth wheel from at least one different tooth of the teeth; and (B) a second toothed wheel which meshes with said first toothed wheel, said second toothed wheel having tooth spaces at least one predetermined tooth space of which meshes with said at least one predetermined tooth of said first toothed wheel and differs in space interval from at least one different tooth space of the tooth spaces, wherein said predetermined tooth of said first toothed wheel meshes with said predetermined tooth space of said second toothed wheel and does not mesh with other tooth spaces.

29. A power transmission apparatus comprising:

(A) a first toothed wheel having tooth spaces at least one predetermined tooth space of which differs in space interval from at least one different tooth space of the tooth spaces; and (B) a second toothed wheel which meshes with said first toothed wheel, said second toothed wheel having teeth at least one predetermined tooth of which meshes with said at least one predetermined tooth space of said first toothed wheel and differs in tooth thickness circumferentially of said second toothed wheel from at least one different tooth of the teeth, wherein said predetermined tooth of said second toothed wheel meshes only with said predetermined tooth space and does not mesh with other tooth spaces.

\* \* \* \* \*

UNITED STATES PATENT AND TRADEMARK OFFICE
CERTIFICATE OF CORRECTION

PATENT NO.    : 6,137,962
DATED         : October 24, 2000
INVENTOR(S)   : Akihiro Namai It is certified that error appears in the above-identified patent and that said Letters Patent is hereby corrected as shown below:

Column 4,
Line 58, delete "toothedwheel" and insert -- toothed-wheel --.

Signed and Sealed this

Eighteenth Day of December, 2001

Attest:

Attesting Officer

JAMES E. ROGAN
Director of the United States Patent and Trademark Office